United States Patent
McDonald et al.

(10) Patent No.: US 12,244,234 B2
(45) Date of Patent: Mar. 4, 2025

(54) PULSE WIDTH MODULATOR FOR A STACKED HALF BRIDGE

(71) Applicant: TEXAS INSTRUMENTS INCORPORATED, Dallas, TX (US)

(72) Inventors: Brent McDonald, Murphy, TX (US); Pradeep Shenoy, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 17/957,897

(22) Filed: Sep. 30, 2022

(65) Prior Publication Data
US 2023/0318465 A1    Oct. 5, 2023

Related U.S. Application Data

(60) Provisional application No. 63/327,505, filed on Apr. 5, 2022.

(51) Int. Cl.
    *H02M 3/335*    (2006.01)
    *H02M 1/088*    (2006.01)

(52) U.S. Cl.
    CPC ....... *H02M 3/33571* (2021.05); *H02M 1/088* (2013.01); *H02M 3/33507* (2013.01)

(58) Field of Classification Search
    CPC ............. H02M 1/088; H02M 3/33507; H02M 3/33571
    See application file for complete search history.

(56) References Cited

U.S. PATENT DOCUMENTS

| | | | | |
|---|---|---|---|---|
| 10,615,701 B2* | 4/2020 | Fu | ................. | H02M 3/33573 |
| 10,903,738 B2* | 1/2021 | Zhang | ................. | H02M 1/08 |
| 2019/0052123 A1* | 2/2019 | Dina | ................. | H02M 3/33576 |
| 2019/0214922 A1* | 7/2019 | Notsch | ................. | H02M 3/285 |
| 2020/0091828 A1* | 3/2020 | Fang | ................. | H02M 3/01 |
| 2020/0228017 A1 | 7/2020 | Hu et al. | | |
| 2021/0067041 A1* | 3/2021 | Cho | ................. | H02M 3/156 |
| 2021/0067045 A1 | 3/2021 | Zhang et al. | | |
| 2021/0408927 A1 | 12/2021 | Zhang et al. | | |

FOREIGN PATENT DOCUMENTS

CN    103703325 A    4/2014

OTHER PUBLICATIONS

PCT Search Report dated Jul. 6, 2023.

* cited by examiner

*Primary Examiner* — Gary A Nash
(74) *Attorney, Agent, or Firm* — Charles F. Koch; Frank D. Cimino

(57) ABSTRACT

An IC is coupled to a power stage having a first half bridge having first and second transistors and a second half bridge having third and fourth transistors. A controller has a first control output to provide first-fourth control signals to the first-fourth transistors. The controller asserts the first-fourth control signals to implement a state sequence. The state sequence includes a first state in which the first and fourth transistors are ON, a second state in which the first and third transistors are ON, a third state in which the second and fourth transistors are ON, and a fourth state in which the second and third transistors are ON. During each switching cycle, the controller implements the first and fourth states with one of the second or third states implemented between the first and fourth states, with every n switching cycles alternating implementation of the second or third states.

20 Claims, 15 Drawing Sheets

US 12,244,234 B2

PULSE WIDTH MODULATOR FOR A STACKED HALF BRIDGE

CROSS-REFERENCE TO RELATED APPLICATIONS

This application claims priority to U.S. Provisional Application No. 63/327,505 filed Apr. 5, 2022, which is hereby incorporated by reference.

BACKGROUND

Many types of systems are operated from a relatively high voltage. Electric vehicles (EVs), for example, include a battery pack that may provide a voltage of 400V, 800V, etc. Such systems include a voltage converter that converts the relatively high input voltage to a much lower voltage for use by the electronics within the system (e.g., infotainment system, microcontrollers, etc.).

SUMMARY

In one example, an integrated circuit (IC) is adapted to be coupled to a stacked half bridge power stage having a first half bridge including a first transistor coupled to a second transistor and having a second half bridge including a third transistor coupled to a fourth transistor. The IC includes a memory and a controller. The controller has a first control output adapted to provide a first control signal to the first transistor, a second control output adapted to provide a second control signal to the second transistor, a third control output adapted to provide a third control signal to the third transistor, and a fourth control output adapted to provide a fourth control signal the fourth transistor. The controller asserts the first through fourth control signals to implement a state sequence for the stacked half bridge power stage. The state sequence includes a first state in which the first and fourth transistors are ON and the second and third transistors are OFF, a second state in which the first and third transistors are ON and the second and fourth transistors are OFF, a third state in which the second and fourth transistors are ON and the first and third transistors are OFF, and a fourth state in which the second and third transistors are ON and the first and fourth transistors are OFF. During each switching cycle, the controller implements the first and fourth states with one of the second or third states implemented between instances of the first and fourth states, with every n switching cycles alternating which of the second or third states is implemented between instances of the first and fourth states, where n is an integer.

DETAILED DESCRIPTION

Figure 1:
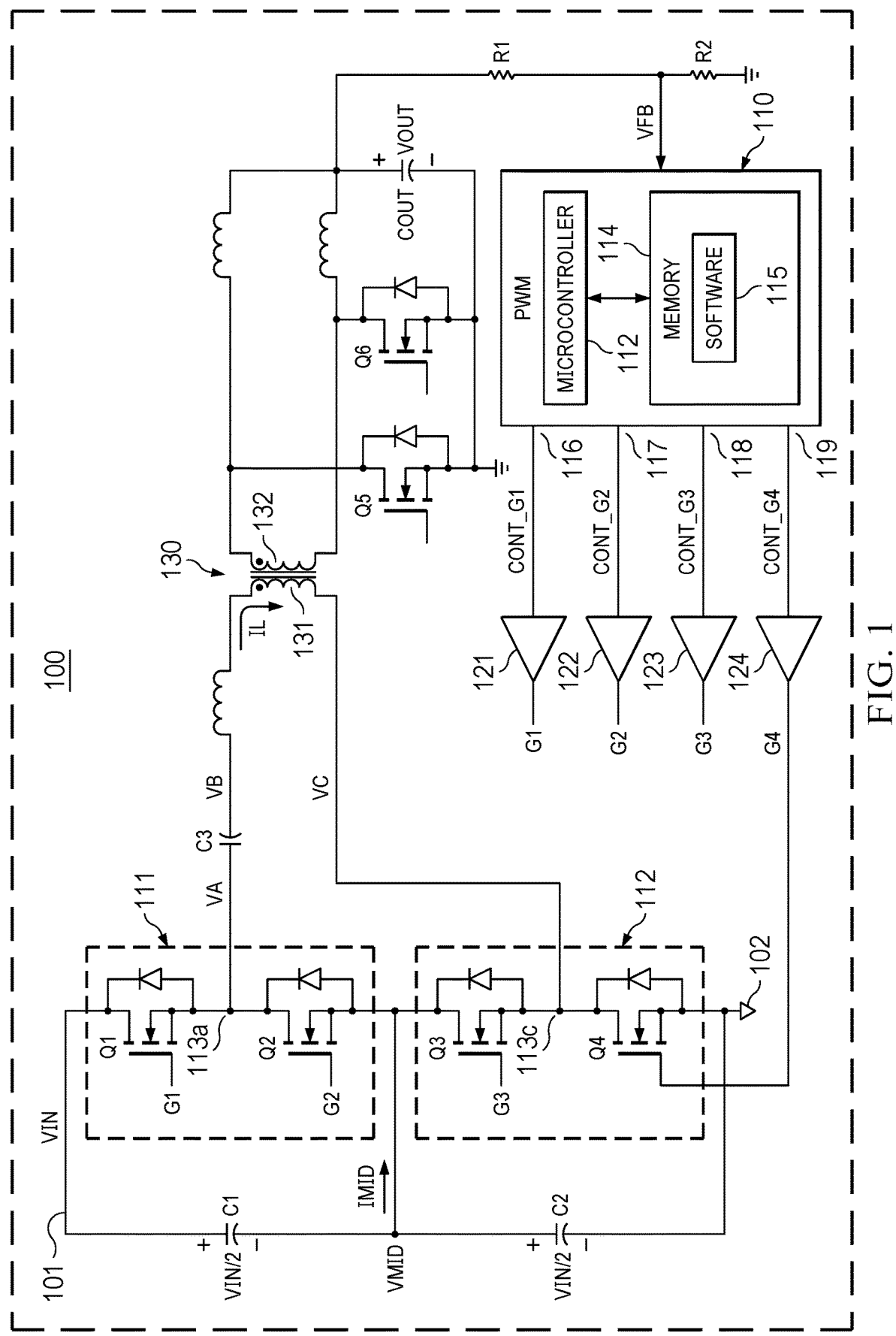
FIG. 1 is a schematic diagram of a voltage converter in accordance with an embodiment.

The same reference numbers or other reference designators are used in the drawings to designate the same or similar (either by function and/or structure) features.

FIG. 1 is a schematic diagram of a voltage converter 100 in accordance with an embodiment. The voltage converter 100 is an electronic device that includes transistors Q1, Q2, Q3, and Q4 configured in a stacked half-bridge arrangement. A first half-bridge 111 includes transistor Q1 coupled to transistor Q2, and a second half-bridge 112 includes transistor Q3 coupled to transistor Q4. Transistors Q1-Q4 are connected in series between a voltage input (VIN) 101 and ground 102. In this example, transistors Q1-Q4 are n-channel field effect transistors (NFETs) but can be implemented as other types of transistors in other examples (e.g., gallium-nitride transistors). The drain of transistor Q1 is coupled to the voltage input 101, and the source of transistor Q4 is coupled to ground 102. The source of transistor Q1 is coupled to the drain of transistor Q2 at node 113a whose voltage is labeled VA. The source of transistor Q2 is coupled to the drain of transistor Q3. The source of transistor Q3 is coupled to the drain of transistor Q4 at node 113c whose voltage is labeled VC.

Capacitors C1 and C2 are coupled in series between VIN and ground. The connection between capacitors C1 and C2 is a middle node whose voltage is labeled VMID. The middle node is coupled to the source of transistor Q2 and to the drain of transistor Q3. Current IMID is the current through the middle node and has a positive polarity in the direction of the arrow.

The voltage converter 100 also includes capacitors C3 and COUT, transformer 130, resistors R1 and R2, a pulse width modulation (PWM) controller 110, and gate drivers 121, 122, 123, and 124. The transformer 130 includes a primary coil 131 and a secondary coil 132. Capacitor C3 is coupled between node 113a and primary winding 131. The current through the primary winding 131 is identified as current IL and is a positive current when flowing in the direction shown by the arrow, and negative in the opposite direction. The voltage on the righthand plate of capacitor C3 is labeled VB, and is coupled to primary winding 131 via an inductor L1. The secondary winding 132 is coupled to capacitor COUT via inductors L2 and L3 and to transistors Q5 and Q6 which are operated by the PWM 110 to rectify the voltage across the secondary winding. The topology of the secondary side of the voltage converter is a current doubler but can be implemented as other types of topologies (e.g., a center-tapped secondary of the transformer 130).

The upper plate of capacitor COUT is the voltage output (VOUT) of the converter 100. Resistors R1 and R2 are coupled in series between VOUT and ground thereby forming a voltage divider. The voltage on the connection between resistors R1 and R2 is a feedback voltage (VFB), which is proportional to VOUT. The feedback voltage VFB is provided to an input of the PWM controller 110. Voltage VFB may be provided to the PWM 110 via an isolation barrier (transformer, optocoupler, etc.).

In the example of FIG. 1, the PWM controller 110 includes a microcontroller 112 coupled to a non-transitory memory 114. Software 115 may be stored in memory 114 and executed by microcontroller 112 to implement some or all of the functionality described herein attributable to the PWM controller 110. In other embodiments, the PWM controller 110 may be implemented as a finite state machine (e.g., a combination of logic gates, flip-flops, registers, etc.).

The PWM controller 110 includes outputs 116, 117, 118, and 119. The PWM controller 110 asserts a control signal on each respective output 116-119—one controller signal corresponding to each of the four transistors Q1-Q4. The control signals are labeled CONT_G1, CONT_G2, CONT_G3, and CONT_G4. The input of driver 121 is coupled to the PWM controller output 116 and thus receives control signal CONT_G1 for transistor Q1. The output of gate driver is gate signal G1 which is coupled to the gate of transistor Q1. Responsive to control signal CONT_G1 being at a logic state (e.g., logic high) indicating that the transistor Q1 should be turned ON, gate driver 121 responds by asserting an appropriate current and/or voltage on the gate of transistor Q1 to turn it ON. In the opposite logic state (e.g., logic low), driver 121 responds by asserting an appropriate current and/or voltage on the gate of transistor Q1 to turn it OFF. Similarly, gate drivers 121, 123, and 124 produce respective gate signals G2, G3, and G4 to the gates of transistors Q2, Q3, and Q4 responsive to their input control signals CONT_G2, CONT_G3, and CONT_G4.

In general, for each half-bridge 111 and 112, either one of the two transistors is ON at any point in time or neither transistor is ON. PWM controller 110 thus asserts control signals CONT_G1 and CONT_G2 in such a way that only one of transistors Q1 and Q2 is ON at any point in time or both transistors Q1 and Q2 are OFF. Similarly, PWM controller 110 thus asserts control signals CONT_G3 and CONT_G4 in such a way that only one of transistors Q3 and Q4 is ON at any point in time or both transistors Q3 and Q4 are OFF.

The PWM controller 110 sequences the ON/OFF states of the transistors in such a way as to ensure one or more of the following conditions are true. First, the sequencing implemented by the PWM controller 110 ensures that the average of current IMID is approximately OA. Because the average of IMID is approximately OA, VMID remains at a level of approximately VIN/2. If VMID were to deviate substantially from VIN/2, one or more of the transistors Q1-Q4 could experience a sufficiently larger drain-to-source voltage (Vds) that could damage that transistor. Further, the sequencing implemented by the PWM controller 110 ensures that the root mean square (rms) current for each of the transistors Q1-Q4 is approximately equal. That the rms currents of the transistors are all approximately the same ensures that the thermal load is distributed approximately evenly among the four transistors. Thermal balancing may increase the efficiency of, and reduce the size of, the thermal solution.

Figure 2:
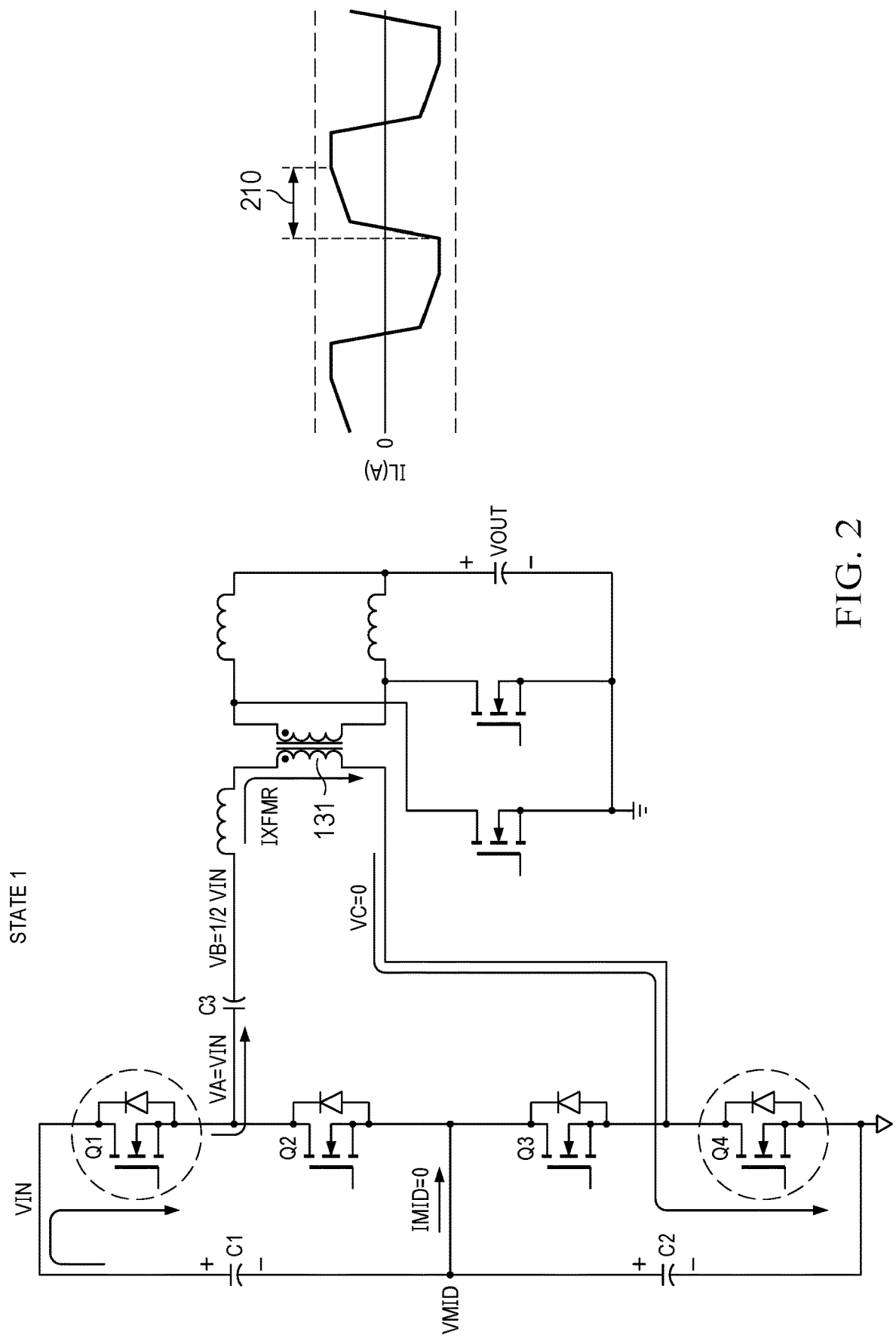
FIGS. 2-9 are schematic diagrams of the voltage converter illustrating the different states of the transistors in accordance with an embodiment.
Figure 4:
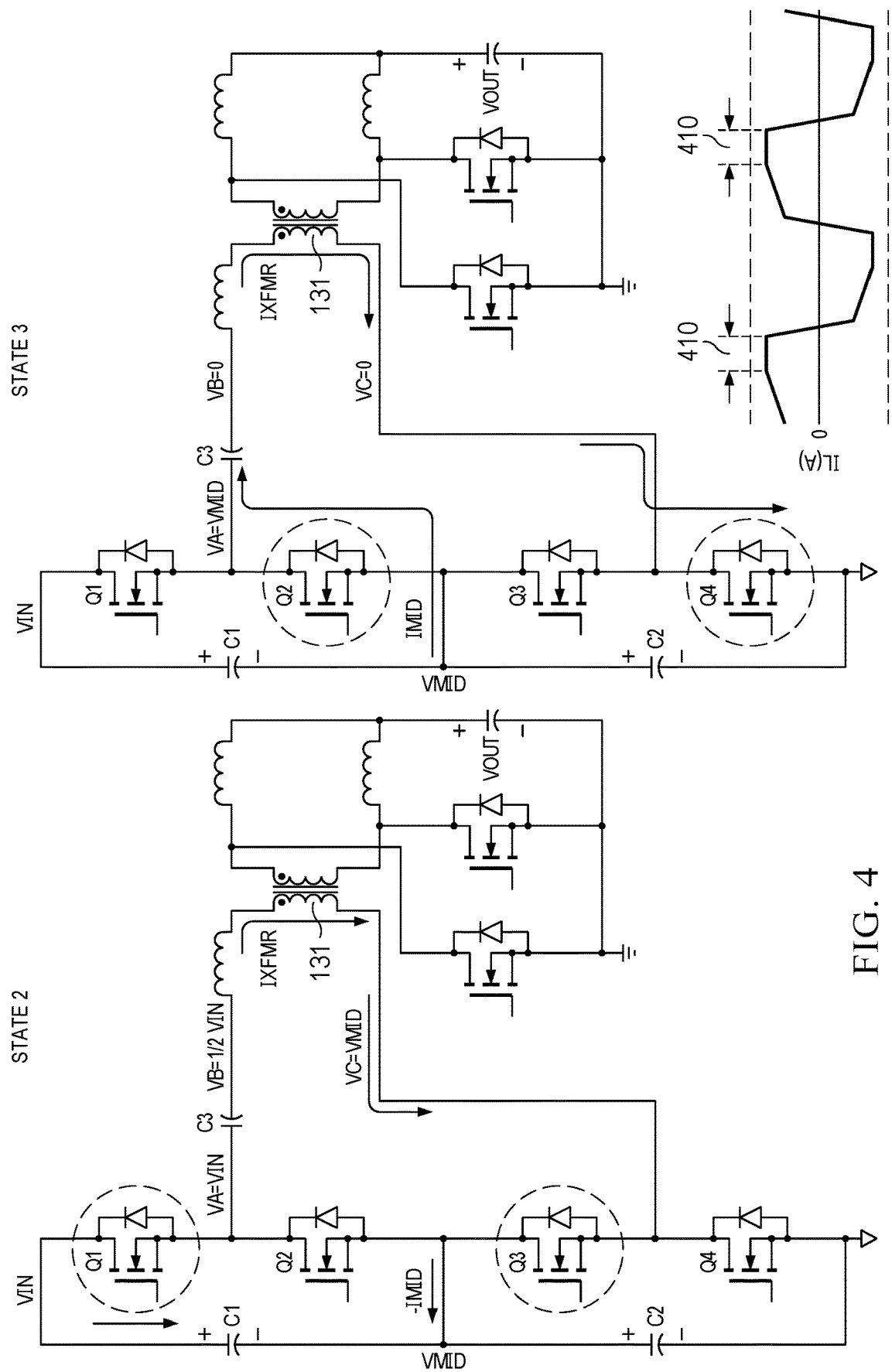
Figure 5:
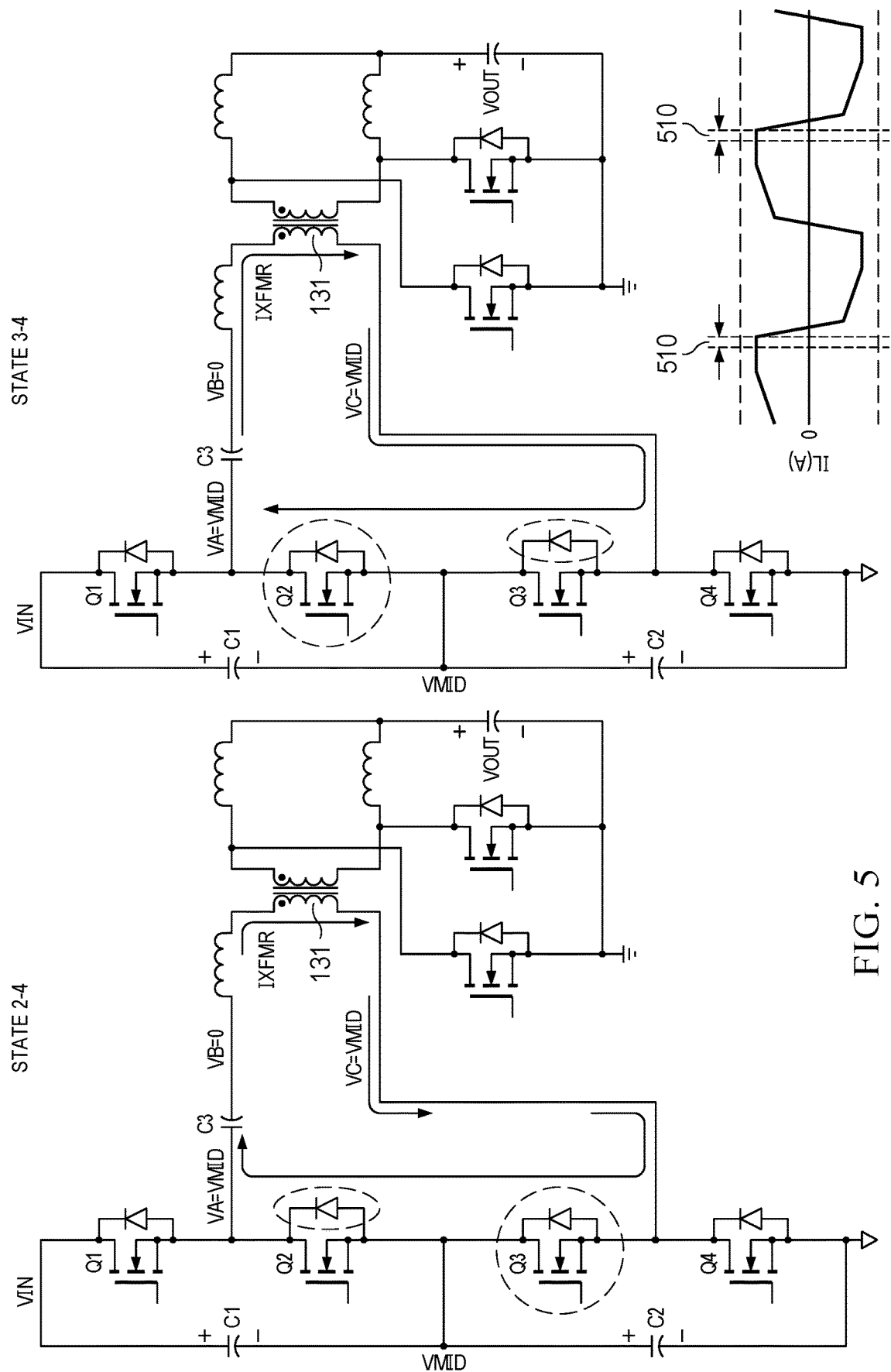
Figure 6:
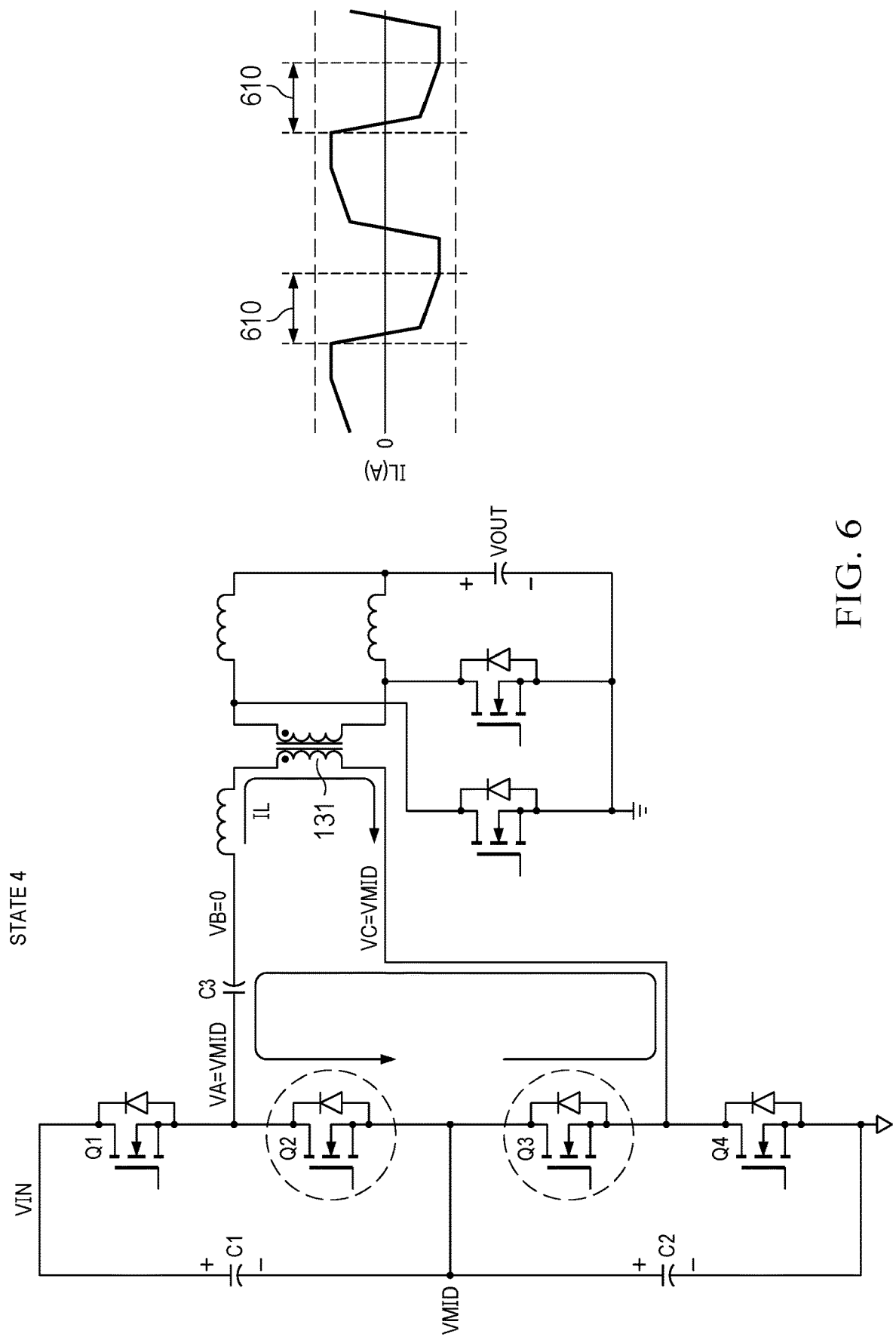
Figure 7:
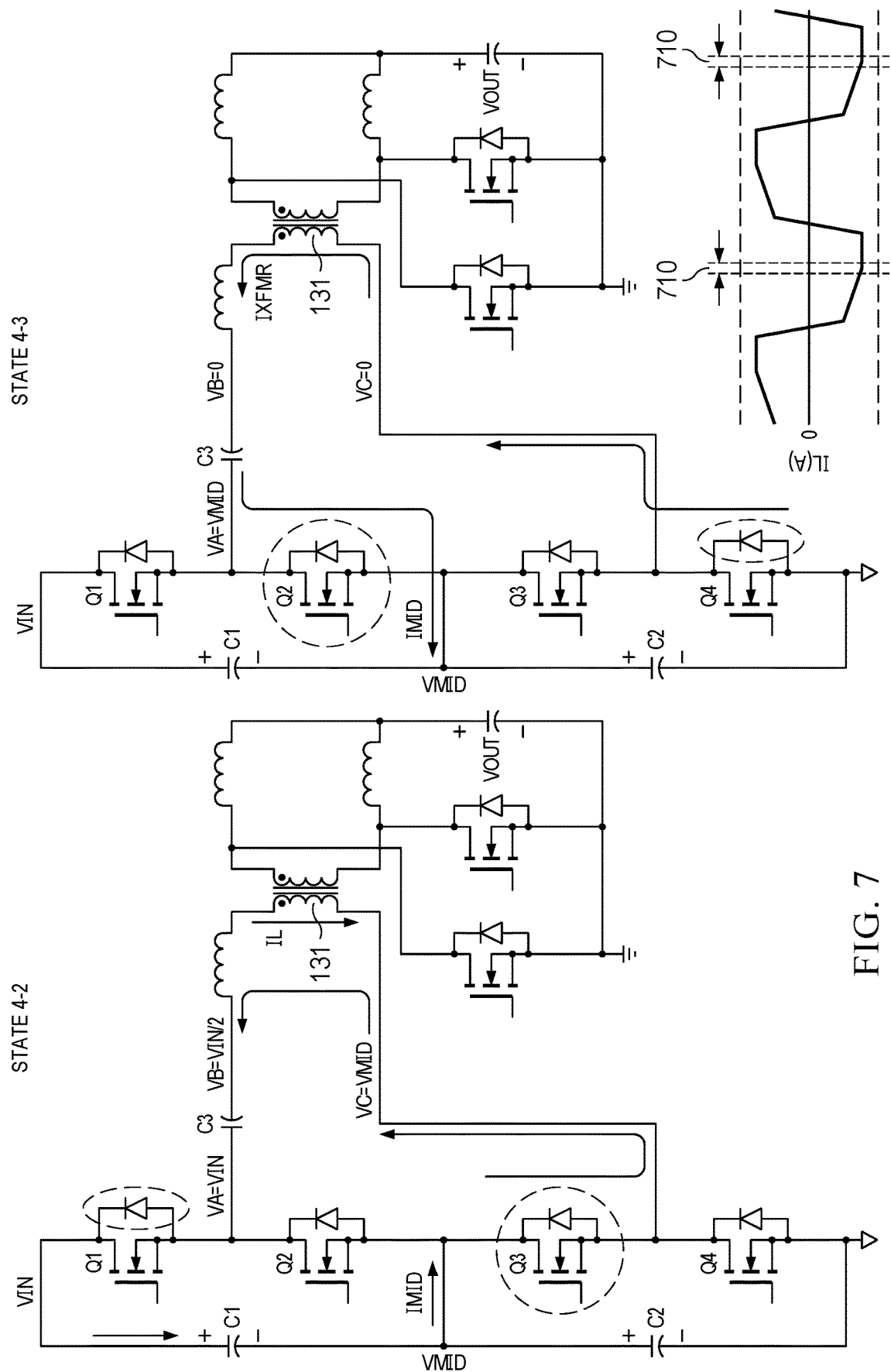
Figure 8:
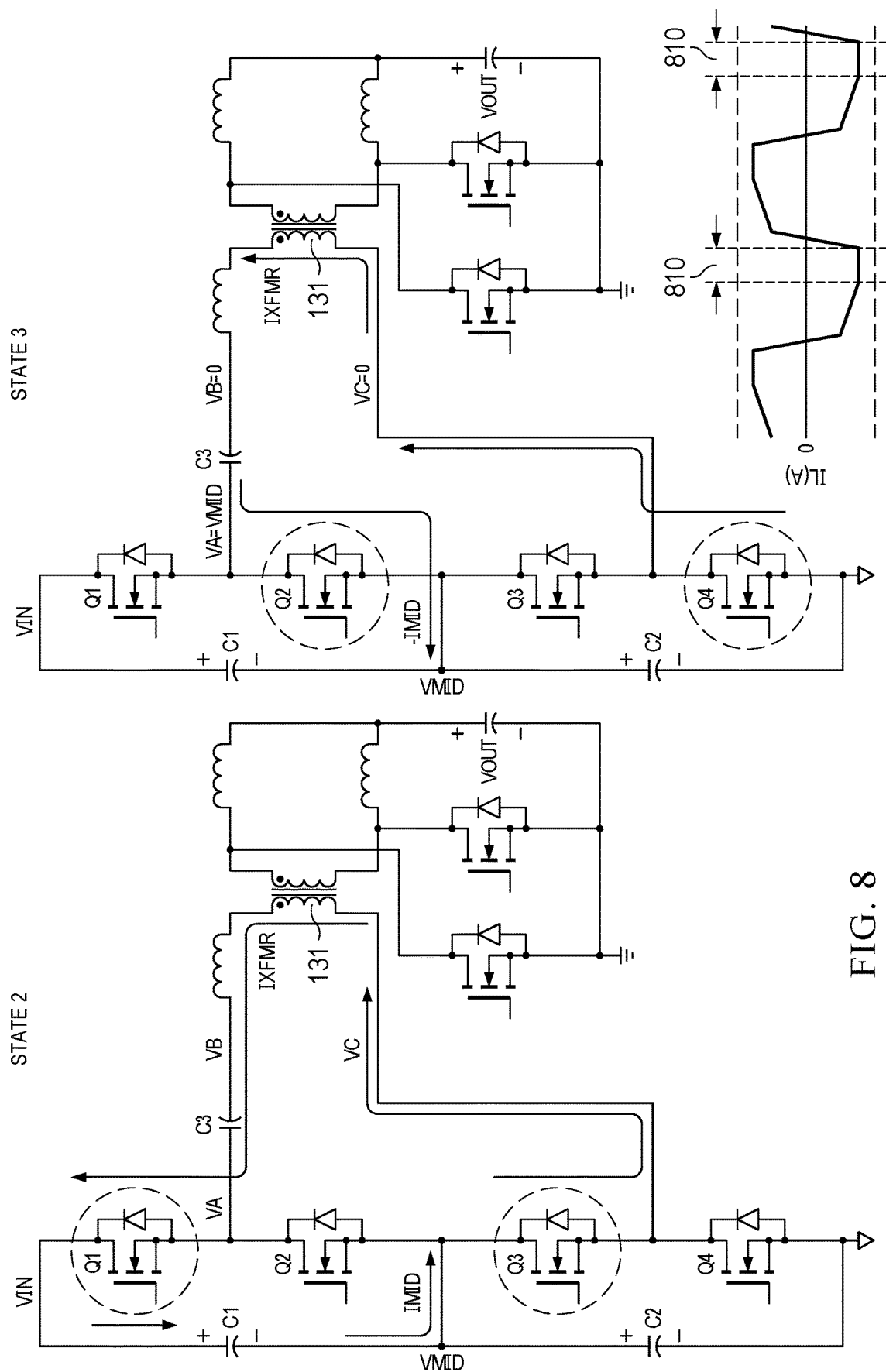
Figure 9:
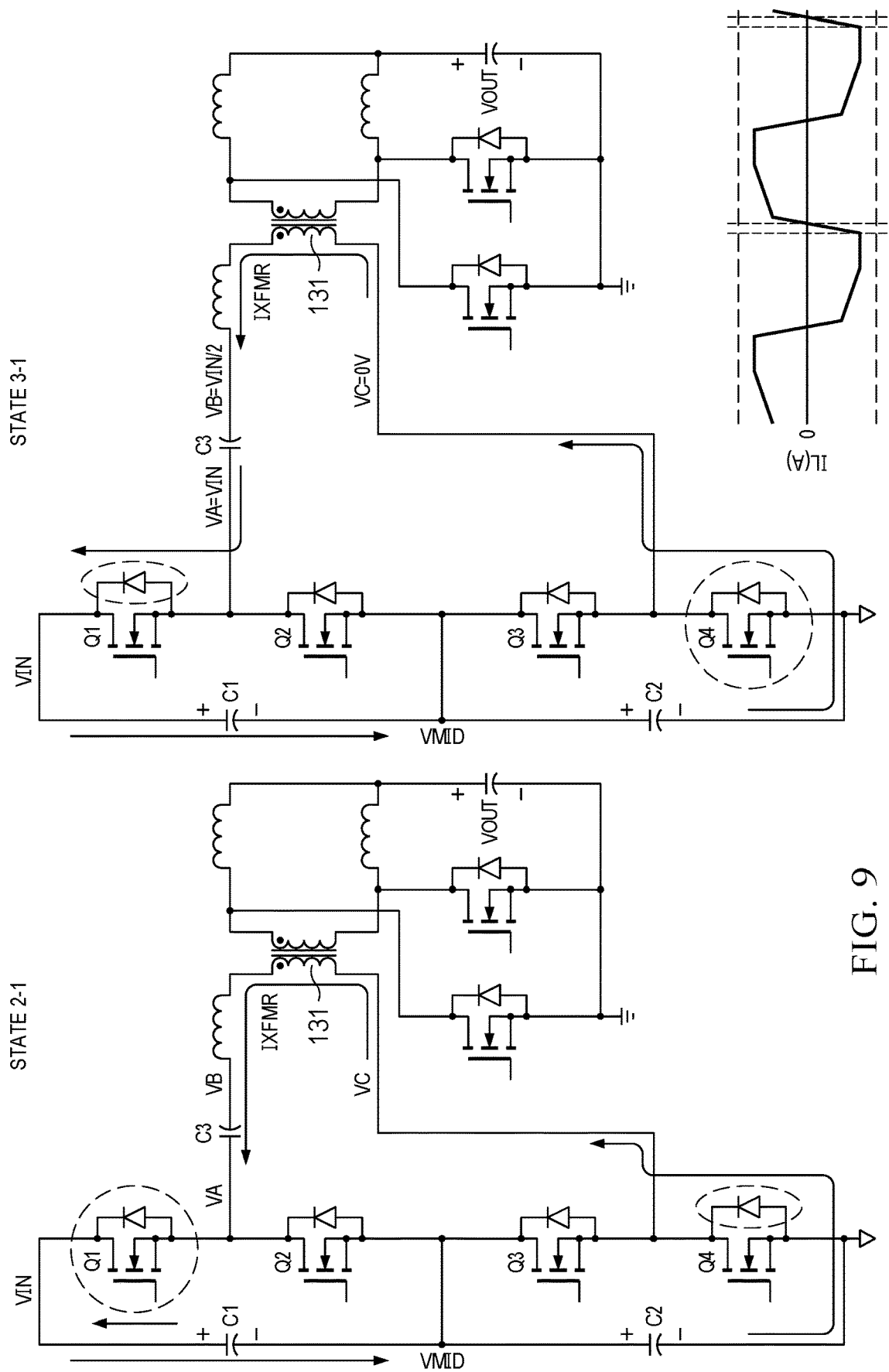

FIGS. 2-9 illustrate eight different operational states of the converter in which the PWM controller 110 operates the converter 100. Each operational state shown in FIGS. 2-9 identifies the transistors of the two half-bridges 111 and 112 that are ON and the transistors that are OFF. In some operational states, a particular transistor is OFF (its channel is not-conducting, but its body diode is on. Those components (transistors or body diodes) that are ON are circled in each drawing. The operational states include operational states 1 (FIG. 2), 2 (FIG. 4), 3 (FIG. 8), and 4 (FIG. 6), as well as operational states 1-2 and 1-3 (FIG. 3), 2-4 and 3-4 (FIG. 5), 4-2 and 4-3 (FIG. 7), and 2-1 and 3-1 (FIG. 9). The reference to operational state m-n, where m is an integer 1-4 and n is an integer 1-4, refers to transitional states between state m and state n. For example, operational state 1-2 is an operational state of the converter to transition the ON/OFF control of the transistors between operational state 1 and operational state 2. FIGS. 2 and 6 illustrate one operational state in each figure, whereas FIGS. 3-5 and 7-9 illustrate two operational states in each figure. Each of FIGS. 2-9 also includes an example waveform of current IL through the primary winding 131 identifying that portion of the waveform that is created by the corresponding operational state.

References are made herein to the body diodes of field effect transistors. In other embodiments, gallium-nitride transistors can be used instead of field effect transistors. Gallium-nitride transistors do not have body diodes but do exhibit a body diode-like behavior referred to as "3RD quadrant conduction."

The following discussion illustrates the progression from operational state 1 to operational state 2 (via operational state 1-2) to operational state 4 (via operational state 2-4). In the example of FIG. 2, in operational state 1 transistors Q1 and Q4 are ON and transistors Q2 and Q3 are OFF. With transistor Q1 ON, voltage VA is approximately equal to VIN. As a result of the switching patterns described herein, the voltage across capacitor C3 is approximately one-half of the input voltage VIN and thus voltage VB is approximately equal to VIN/2. Further, with transistor Q4 being ON, the voltage VC is approximately equal to ground (0V). Accordingly, the voltage across the primary winding 131 is VIN/2 (the terminal of the winding with the dot is VIN/2 higher than the opposing terminal of the winding). Current flows in the direction of the arrows, e.g., from VIN, through transistor Q1, capacitor C3, through winding 131, and through transistor Q4 to ground. Current IL increases as identified by reference numeral 210 in the waveform. When the rate of increase of the current is very steep the voltage across the transformer is 0V. This means that all of the switch voltage appears across the resonant inductor (less the voltage on the blocking capacitor). After the transformer receives a voltage (either positive or negative depending on the particular half-cycle of operation) the applied voltage to the resonant inductor is smaller by that same voltage. Current IMID is approximately equal to OA in this operational state.

Figure 3:
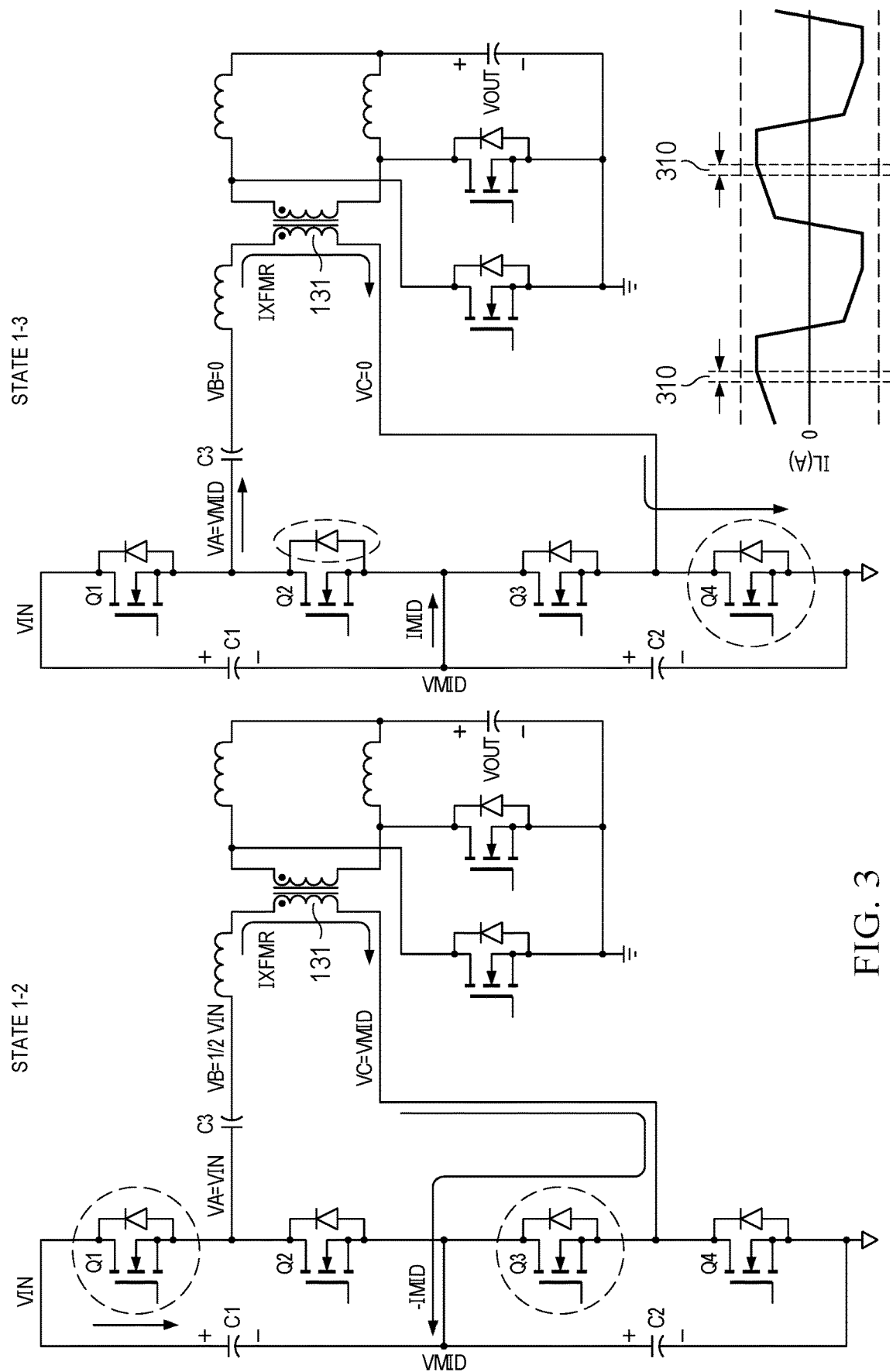

FIG. 3 shows an example of an operational state 1-2 in which transistor Q1 is still ON (from operational state 200) and transistor Q4 is turned OFF (and transistors Q2 and Q3 remain OFF from operational state 1). During this operational state, both of transistors Q3 and Q4 are OFF to implement a deadtime between turning transistor Q4 OFF and transistor Q3 ON, as described above. With transistor Q1 still being ON, voltage VA remains approximately equal to VIN, and voltage VB is approximately equal to VIN/2. Further, with transistor Q4 being OFF, current flows in the direction of the arrows, e.g., from VIN, through transistor Q1, capacitor C3, through winding 131, and through the body diode of transistor Q3, and capacitor C3. Current IMID is non-zero in this configuration and is a negative current (with reference to the polarity defined above). With the body diode being ON, the voltage VC is VMID plus the voltage drop across the body diode (Vd). Voltage Vd (e.g., 0.7V) is substantially less than VMID. VMID is approximately equal to the target VIN/2 (with the control scheme described herein), which may be 400V for a VIN of 800V. FIG. 3 shows that voltage VC is approximately VMID (the difference being the small voltage drop across the body diode). In this operational state, the voltage drop across the primary winding is approximately 0V. The current through an inductor having a 0V drop across the inductor remains relatively constant, which means that current IL remains relatively flat as identified by reference numeral 310 in FIG. 3 (reference numeral 310 identifies that portion of time of the switching cycle that converter would be configured in accordance with operational stale 1-2.

FIG. 4 shows an example of an operational state 2 in which transistor Q1 is still ON (from operational state 1-2) and transistor Q3 is turned ON (and transistors Q2 and Q4 remain OFF from operational state 1-2). Because of the Vd voltage drop (which is relatively small) across the body diode of transistor Q3, relatively little switching loss occurs when turning ON transistor Q3 (referred to as zero voltage switching, ZVS). Operational state 400 is similar to operational state 1-2 except that transistor Q3 is turned ON and current flows through that transistor's channel rather than through its body diode. Current IMID remains a negative current. The current through winding 131 is also approximately constant as shown by reference numeral 410 as a result of an approximately 0V drop across the winding, as described above.

FIG. 5 shows an example of an operational state 2-4 in which transistor Q1 has been turned OFF and transistor Q3 remains ON (from operational state 2). The body diode of transistor Q2 is ON and conducting current. Because transistor Q3 and the body diode of transistor Q2 are ON, voltages VA and VC are approximately VMID. Due to the VIN/2 voltage drop across capacitor C3, voltage VB is approximately 0V, and thus the voltage drop across the primary winding 131 is approximately −VMID. The negative voltage drop across the primary winding causes the current through the primary winding to decrease as identified at reference numeral 510.

FIG. 6 shows an example of operational state 4 in which transistors Q2 and Q3 are ON and transistors Q1 and Q4 are OFF. Because in operational state 2-4, the body diode of transistor was ON, PWM controller 110 can cause transistor Q2 to be turned ON with ZVS. With transistors Q2 and Q3 ON, voltages VA and VC are approximately equal to VMID. Voltage VB is approximately equal to 0V as a result of the VIN/2 voltage drop across capacitor C3. The voltage drop across the primary winding 131 is negative which causes a continued and rapid decrease in the current through the winding as shown at 610. The current IL becomes negative as shown. The two different slopes of the current at this point occur for much the same reason as described above with respect to FIG. 2. The direction of current flow in this operational state is from VMID, through the primary winding 131, and through capacitor C3 and transistor Q2 back to VMID. Current IMID is approximately equal to 0A in this operational state.

FIGS. 7, 8, and 9 illustrate a possible sequence of operational states 4-2, 2, and 2-1 to return back to operational state 1. In FIG. 7, the PWM controller 110 turns OFF transistor Q2, so that transistor Q3 remains ON and transistors Q1, Q2, and Q4 are OFF. In this operational state, voltages VA, VB, and VC are approximately equal to VIN, VIN/2, and VMID, respectively. Because VMID equals VIN/2, the voltage drop across the primary winding 131 is approximately equal to 0V and the current through the primary winding remains relatively constant as indicated at reference numeral 710. Because current IL was negative in the previous operational state 4, the current IL remains negative in operational state 4-2. The direction of current flow is from VIN, through capacitor C1, through transistor Q3, and through the primary winding, capacitor C3, and the body diode transistor Q1 back to VIN. The direction of current IL is opposite that during operational state 1 and is shown in the waveform of FIG. 7 as a negative current. Current IMID is positive in this operational state.

As shown in FIG. 8, the PWM controller 110 can then turn on transistor Q1 with ZVS to configure the converter again into operational state 2. The voltages for VA, VB, and VC are approximately the same as described above for operational state 2 in FIG. 2, but the direction of current through the circuit is in the opposite direction. As described above, the voltage difference across the primary winding is approximately 0V, and thus the current IL is approximately constant, albeit negative as identified by reference numeral 810. Current IMID remains positive in this state.

FIG. 9 illustrates operational state 2-1 in which transistor Q3 is turned OFF by PWM controller 110 thereby causing the body diode of transistor Q4 to turn ON. Voltages VA, VB, and VC are approximately equal to VIN, VIN/2 and 0V, respectively. Current flow through operational state 2-1 in FIG. 9 is through the body diode of transistor Q4, primary winding 131, capacitor C3, and transistor Q1 to VIN. The current of the primary winding is negative (with respect to the polarity defined above for IL) but increasing towards OA due voltage VB being more positive than voltage VC. Following operational state 2-1 in FIG. 9, the PWM controller 110 can configure the converter back into operational state 1 as shown in FIG. 2.

FIGS. 2-9 illustrate another possible sequence of operational states. From operational state 1 in FIG. 2, the PWM controller 110 can configure the converter into operational state 1-3 as shown at the righthand side of FIG. 3. In operational state 1-3, current flows through the body diode of transistor Q2, capacitor C3, the primary winding 131, and transistor Q4. The direction of current IMID in state 1-3 is opposite to the direction of current IMID in state 1-2. Voltages VA, VB, and VC are approximately VMID, 0V, and 0V, respectively, and thus the voltage drop across the primary winding 131 is approximately 0V. The current through the primary winding 131 remains relatively constant (310) as was the case for the operational state 1-2 in FIG. 3.

From operational state 1-3, the PWM controller 110 may configure the converter into operational state 3 on the righthand side of FIG. 4. For operational state 3, the PWM controller 110 turns ON transistor Q2 and maintains transistor Q4 in an ON state. The direction of current flow through the primary winding 131 is the same in operational state 3 as it was for operational state 1-3 on the righthand side of FIG. 3 but now the current flows through the channel of transistor Q3 rather than through its body diode. Current IMID continues to flow in the direction shown in FIG. 3. The voltage drop across the primary winding remains at approximately 0V in this operational state and thus the primary winding current is relatively constant as shown at 410.

FIG. 5 shows another example of operational state 3-4 in which the PWM controller 110 turns OFF transistor Q4 and maintains transistor Q2 in an ON state. The body diode of transistor Q3 is ON and conducting current. Because transistor Q2 and the body diode of transistor Q3 are ON, voltages VA and VC are approximately VMID. Due to the VIN/2 voltage drop across capacitor C3, voltage VB is approximately 0V, and thus the voltage drop across the primary winding 131 is approximately −VMID, as was the case for operational state 4. The negative voltage drop across the primary winding causes the current through the primary winding to decrease as identified at reference numeral 510.

The current circulates through the body diode of transistor Q3, capacitor C3, the primary winding 131 and transistor Q4 in the same direction as that shown for operational state 2-4 in FIG. 5.

From operational state 3-4, the PWM controller may configure the converter into operational state 4 shown in FIG. 6 and described above. From operational state 3-4, the PWM controller 110 can then configure the converter into operational state 4-3 shown on the righthand side of FIG. 7. In this state, PWM controller turns OFF transistor Q3 resulting in the body diode of transistor Q4 and transistor Q2 being ON. In this configuration, the voltage drop across the primary winding 131 is approximately 0V as was the case for the operation state 4-2 shown on the left-hand side of FIG. 7. Current through the primary winding remains relatively constant as shown at 710. In FIG. 7, current IMID is negative for operational state 4-3 and thus is in the opposite direction from operational state 4-2 in FIG. 7.

The PWM controller 110 then may turn ON transistor Q4 (as shown for operational state 3 on the right-hand side of FIG. 8) and current flows in the same direction as was the case for operational state 4-3 in the right-hand side of FIG. 7. The voltage drop across the primary winding 131 is approximately 0V and the current through the primary winding is relatively constant as shown at 810.

The PWM controller 110 then may configure the converter into operational state 3-1 shown in the right-hand side of FIG. 9. In this configuration, transistor Q2 is turned OFF and transistor Q4 remains ON. In this state, current IMID is approximately 0A.

Figure 10:
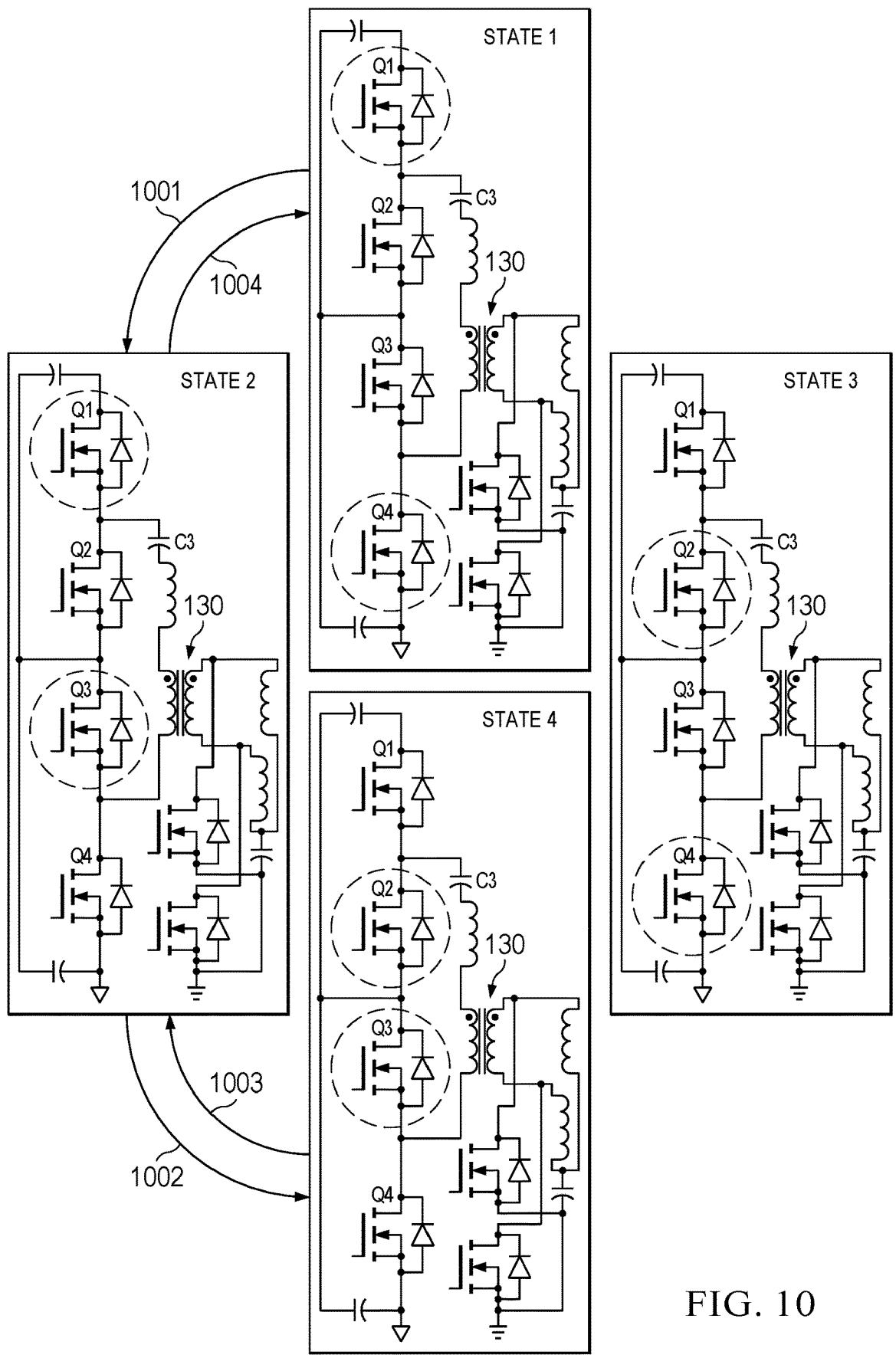
FIG. 10 is a state diagram illustrating one possible set of states for operating the transistors of the voltage converter.

FIGS. 2-9 and the description above describe multiple possible operational states of the transistors Q1-Q4 of the converter and the currents and voltages in the progression of one operational state to the next. FIG. 10 illustrates a possible sequencing of the operational states described above in a way that results in an approximately zero average IMID current. The interim states (e.g., operational states 1-2, 2-4, etc.) are not shown for ease of understanding, but such states would be included in the progression between the operational states shown in FIG. 10. Those transistors that are ON are circled. In this example, the PWM controller 110 sequences the converter to transition from operational state 1 to operational state 2 (indicated by arrow 1001) to operational state 4 (indicated by arrow 1002), back to operational state 2 (indicated by arrow 1003), back to operational state 1 (indicated by arrow 1004). In one embodiment, the PWM controller 110 repeatedly sequences the converter between operational states 1, 2, and 4 as shown without also including operational state 3.

Focusing on the magnitude of current IMID between operational states 1, 2, and 4, in operational state 1, IMID is 0 A as described above regarding operational state 1 on the left-hand side of FIG. 2. Similarly, IMID is 0 as described above regarding operational state 4 on the left-hand side of FIG. 6. However, when progressing from operational state 1 to operational state 2, IMID is negative as described above regarding operational state 2 on the left-hand side of FIG. 4. When progressing from operational state 4 back to operational state 2, IMID is positive as described above regarding operational state 2 shown in the left-hand side of FIG. 8. The direction of current IMID is opposite each time the converter is configured for operational state 2 in the repeated sequencing of operational states 1, 2, 4, 2, 1, 2, 4, etc. Accordingly, the average value of current IMID is approximately 0A, which greatly reduces the deviation of voltage VMID from VIN/2.

Figure 11:
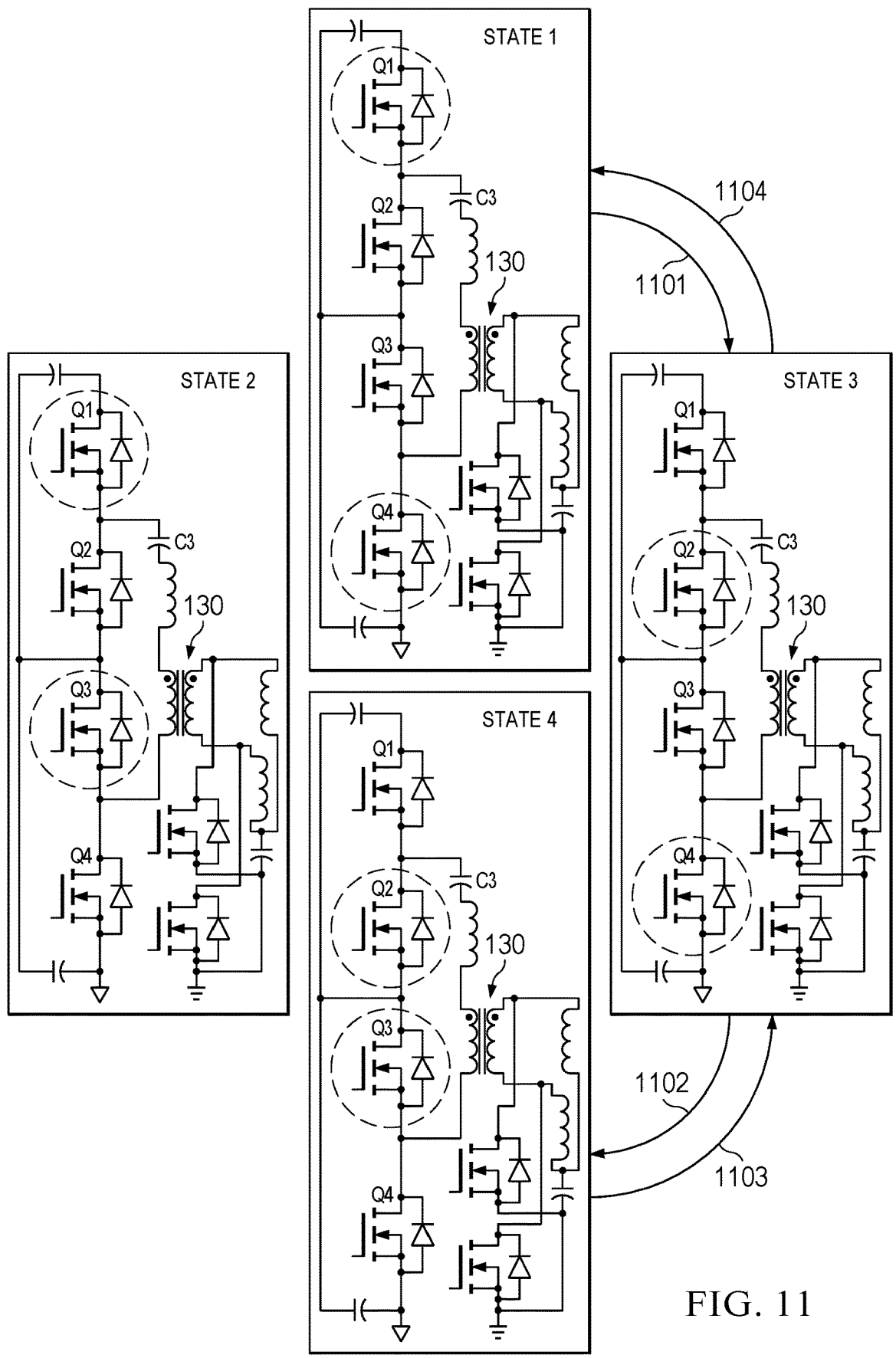
FIG. 11 is a state diagram illustrating another possible set of states for operating the transistors of the voltage converter.

FIG. 11 illustrates another possible sequencing of the operational states described above in a way that also results in an approximately zero average IMID current. Those transistors that are ON are circled. In this example, the PWM controller 110 sequences the converter to transition from operational state 1 to operational state 3 (indicated by arrow 1101) to operational state 4 (indicated by arrow 1102), back to operational state 3 (indicated by arrow 1103), back to operational state 1 (indicated by arrow 1104). In one embodiment, the PWM controller 110 repeatedly sequences the converter between operational states 1, 3, and 4 as shown without also including operational state 2.

Focusing on the magnitude of current IMID between operational states 1, 3, and 4, in operational state 1, IMID is 0 A as described above regarding operational state 1 on the left-hand side of FIG. 2. Similarly, IMID is 0 as described above regarding operational state 4 on the left-hand side of FIG. 6. However, when progressing from operational state 1 to operational state 3, IMID is positive as described above regarding operational state 3 on the right-hand side of FIG. 4. When progressing from operational state 4 back to operational state 3, IMID is negative as described above regarding operational state 3 shown in the right-hand side of FIG. 8. The direction of current IMID is opposite each time the converter is configured for operational state 3 in the repeated sequencing of operational states 1, 3, 4, 3, 1, 3, 4, etc. Accordingly, the average value of current IMID is approximately 0A, which greatly reduces the deviation of voltage VMID from VIN/2.

Figure 12:
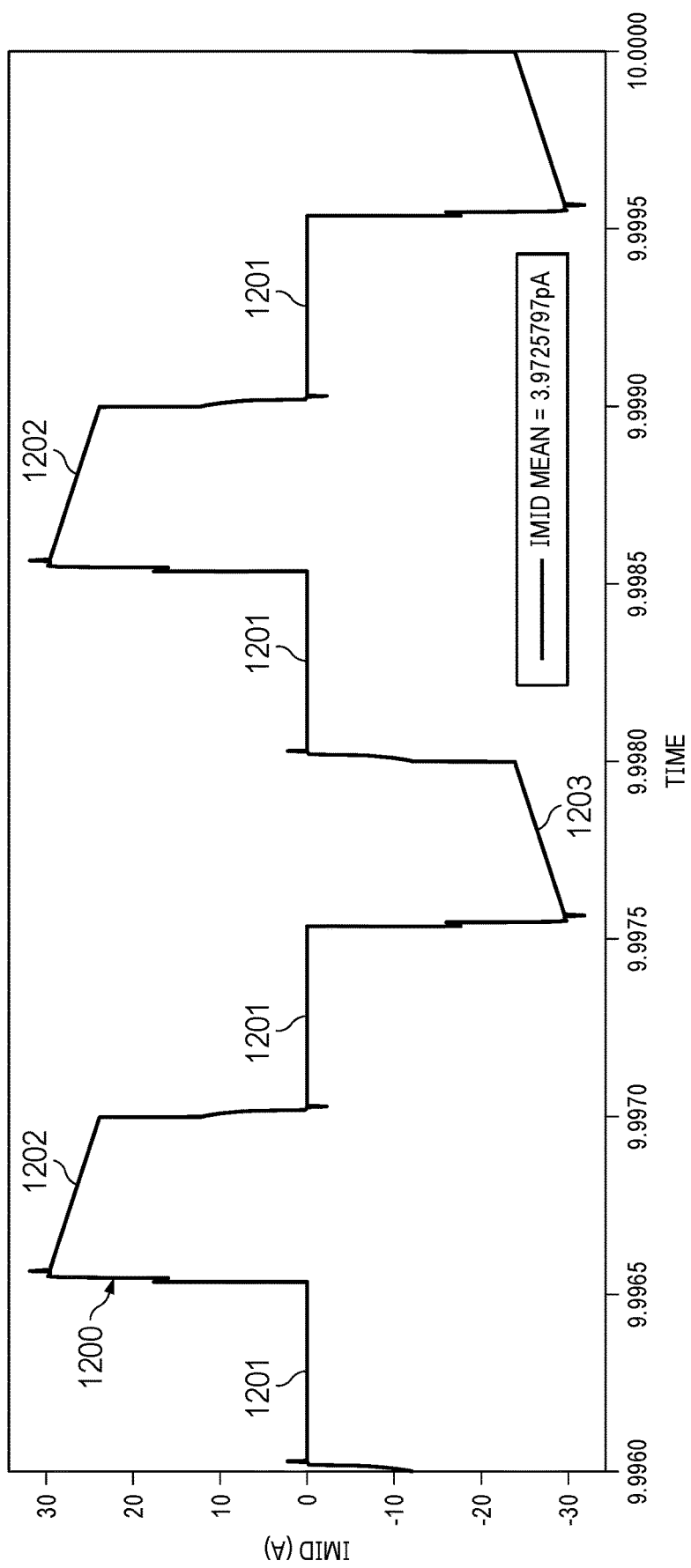
FIG. 12 is a waveform of the midpoint current of the stacked half-bridge in accordance with an example.

The sequencing between operational states 1 and 4 may include intervening operational state 2 (FIG. 10) or intervening operational state 3 (FIG. 11). In either case, the average level of current IMID advantageously is approximately 0A. FIG. 12 shows an example waveform 1200 for current IMID. While in operational states 1 or 4, current IMID is approximately 0A as shown at 1201. Current IMID is positive (1202) every other cycle and is negative (1203) for the other cycles during the interim operational states 2 or 3. In this example, the average level of current IMID is −390.72 pico-amperes (pA) which is approximately 0A.

In FIG. 10, transistor Q1 is ON for both operational states 1 and 2, while transistor Q2 is ON for operational state 3 but not operational states 1 or 2. Accordingly, transistor Q1 is ON for more time (higher duty cycle) than transistor Q2. Similarly, transistor Q3 is ON for more time than transistor Q4 in the sequencing of FIG. 10. Thus, in the sequencing of FIG. 10, transistors Q1 and Q3 are ON for more time than transistors Q2 and Q4. In FIG. 11, transistors Q2 and Q4 are ON for more time than transistors Q1 and Q3. This disparity of the ON-time of the transistors results in an uneven thermal loading of the transistors. Uneven thermal loading may result in greater power loss, lower efficiency, and a larger thermal solution to sufficiently cool the transistors.

Figure 13:
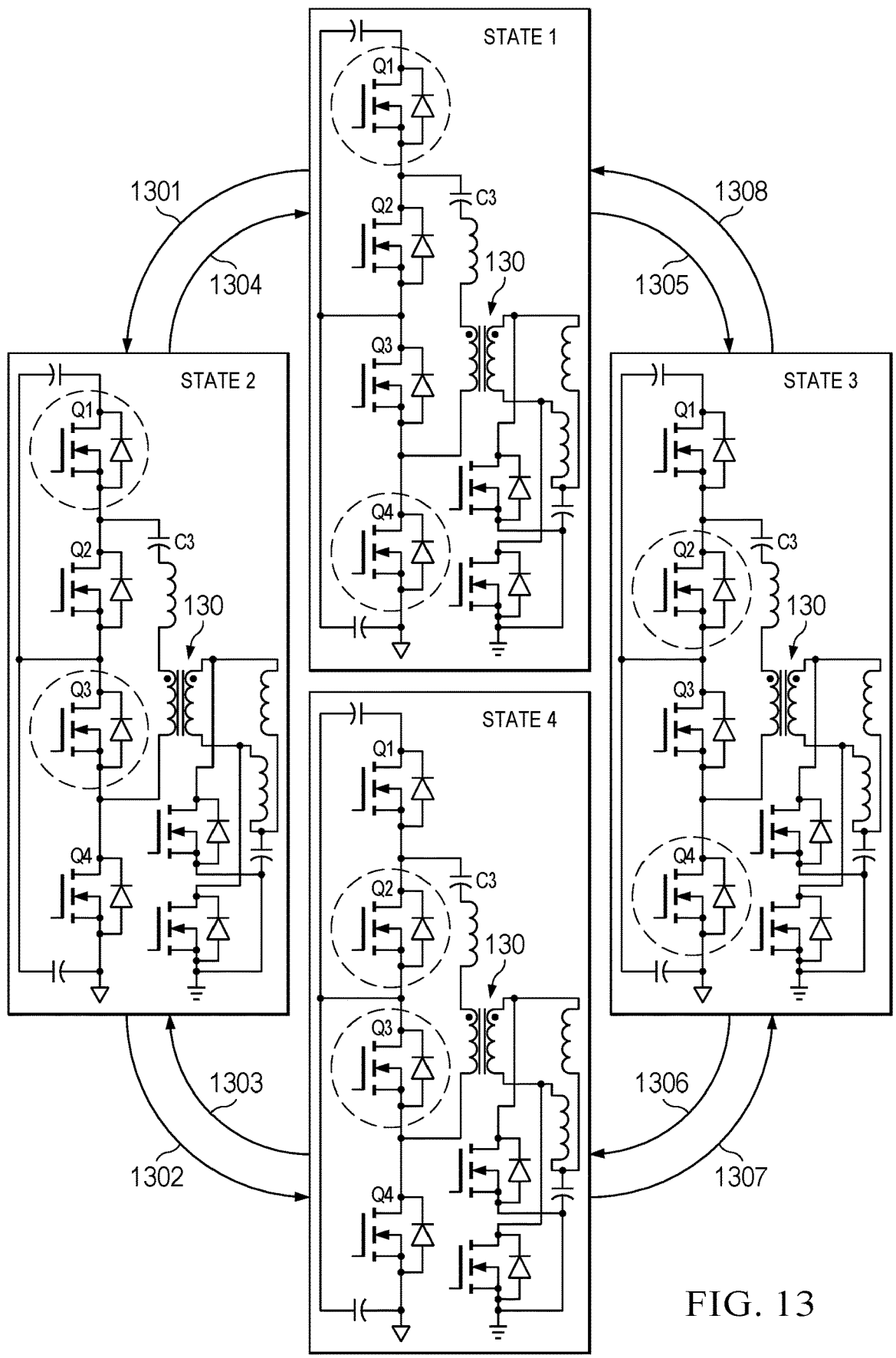
FIG. 13 is a state diagram illustrating yet another possible set of states for operating the transistors of the voltage converter.

In accordance with another embodiment, FIG. 13 illustrates another possible sequencing between the operational states 1-4 in a way that reduces the thermal imbalance between the transistors of the converter. In the example of FIG. 13, the PWM controller 110 sequences between operational states 1 and 4 by alternately transitioning through operational states 2 and 3. In one example, the sequencing includes a repeating pattern including operational states 1-2-4-2-1-3-4-3-1, and so on. The sequencing of FIG. 13 alternates between the sequencing of FIG. 10 and the sequencing of FIG. 11. As a result, the thermal loading is shared more evenly between the transistors Q1-Q4 of the converter than either the sequencing of FIG. 11 or 12 individually.

Variations of the sequencing of FIG. 13 are possible as well. For example, the PWM controller 110 can transition between operational states 1 and 4 by way of intervening operational state 2 before then transitioning between operational states 1 and 4 by way of intervening operational state 3. In this case, the sequencing includes 1-2-4-2-1-2-4-2-1-1-3-4-3-1-3-4-3-1, and so on and so on.

Figure 14:
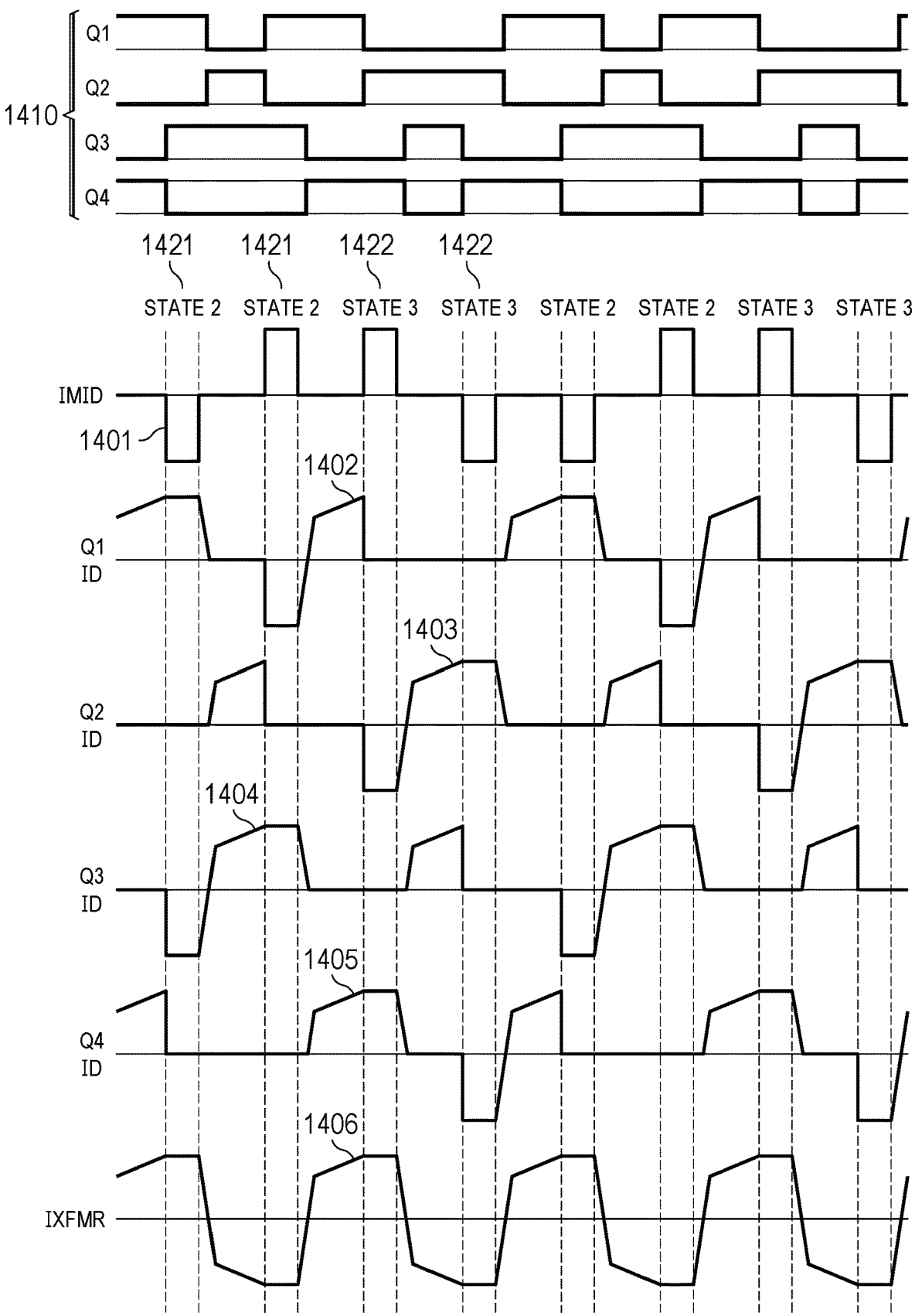
FIG. 14 are waveforms of the midpoint current and drain currents of the transistors for the different operational states of the voltage converter.

FIG. 14 includes waveforms including IMID 1401, the drain current for transistor Q1 (1402), the drain current for Q2 (1403), the drain current for transistor Q3 (1404), the drain current for transistor Q4 (1405), and the current through the primary winding 131 of the transformer (1406). These waveforms are the result of the sequencing illustrated in FIG. 13 alternating between interim intervening states 2 and 3 as described above. Between operational states 1 and 4, the PWM controller 110 implements operational state 2 twice in a row as indicated by reference number 1421, then operational state 3 twice in a row as indicated by reference number 1422. The current IMID is negative for one instance of operational 2 (or 3) and positive for the other instance of operational state 2 (or 3). Because IMID is negative and positive for approximately the same amount of time, the average level of IMID is advantageously approximately 0A. The timing diagram shown at 1410 indicates the ON and OFF states of the transistors Q1 and Q2 for the various operational states described above.

Figure 15:
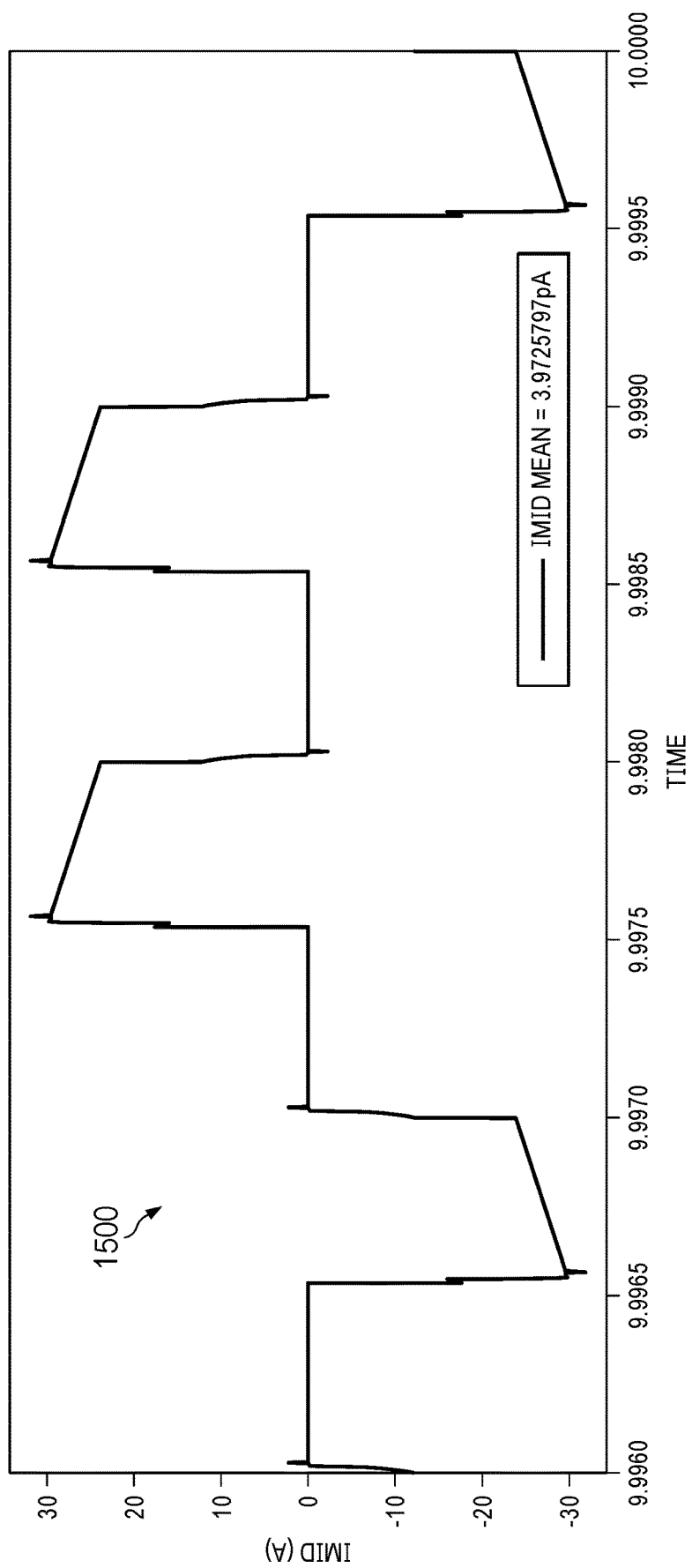
FIG. 15 is an example waveform of the midpoint current of the stacked half-bridge in accordance with the state diagram of FIG. 13.

FIG. 15 shows an example waveform 1500 for current IMID for the operational state sequencing illustrated in FIG. 13. The average of IMID is 3.97 pA (approximately 0A).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a bipolar junction transistor (BJT—e.g. NPN or PNP), an insulated gate bipolar transistor (IGBT), and/or a junction field effect transistor (JFET) may be used in place of or in conjunction with the transistors described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References herein to a FET being "ON" means that the conduction channel of the FET is present and drain current may flow through the FET. References herein to a FET being "OFF" means that the conduction channel is not present, so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. An integrated circuit (IC) comprising:
   a memory; and
   a controller coupled to the memory, wherein the controller includes:
   a first control output configured to provide a first control signal to a first transistor of a first half bridge power state,
   a second control output configured to provide a second control signal to a second transistor coupled to the first transistor,
   a third control output configured to provide a third control signal to a third transistor of a second half bridge power stage, and
   a fourth control output configured to provide a fourth control signal to a fourth transistor coupled to the first transistor;
   wherein the controller is configured to assert the first through fourth control signals to implement a state sequence;
   wherein the state sequence includes:
   a first state in which the first and fourth transistors are ON and the second and third transistors are OFF,
   a second state in which the first and third transistors are ON and the second and fourth transistors are OFF,
   a third state in which the second and fourth transistors are ON and the first and third transistors are OFF, and
   a fourth state in which the second and third transistors are ON and the first and fourth transistors are OFF; and
   wherein during each switching cycle, the controller is configured to implement the first and fourth states with one of the second or third states implemented between instances of the first and fourth states, with every n switching cycles alternating which of the second or third states is implemented between instances of the first and fourth states, where n is an integer.

2. The IC of claim 1, where n is 1.

3. The IC of claim 1, where n is 2.

4. The IC of claim 1, wherein:
   the state sequence includes
   a first-second interim state in which the first transistor is ON and the second, the third, and the fourth transistors are OFF;
   a first-third interim state in which the fourth transistor is ON, the first, the second, and the third transistors are OFF, and a body diode of the second transistor is ON;
   a second-fourth interim state in which the third transistor is ON, the first, the second, and the fourth transistors are OFF, and the body diode of the second transistor is ON;
   a third-fourth interim state in which the second transistor is ON, the first, the third, and the fourth transistor are OFF, and a body diode of the third transistor is ON;
   a fourth-second interim state in which the third transistor is ON, the first, the second, and the fourth transistors are OFF, and a body diode of the first transistor is ON;
   a fourth-third interim state in which the second transistor is ON, the first, the third, and the fourth transistors are OFF, and a body diode of the fourth transistor is ON;
   a second-first interim state in which the first transistor is ON, the second, the third, and the fourth transistors are OFF, and the body diode of the fourth transistor is ON; and
   a third-first interim state in which the fourth transistor is ON, the first, the second, and the third transistors are ON, and the body diode of the first transistor is ON.

5. The IC of claim 4, wherein in response to the controller implementing a state sequence of the first state, the second state, the fourth state, the second state, and the first state, the controller is configured to implement:
   the first-second interim state subsequent to implementing a first instance of the first state;
   the controller is configured to implement the second-fourth interim state subsequent to implementing a first instance of the second state;
   the controller is configured to implement the fourth-second interim state subsequent to implementing the fourth state; and
   the controller is configured to implement the second-first interim state subsequent to implementing a second instance of the second state.

6. The IC of claim 4, wherein in response to the controller implementing a state sequence of the first state, the third state, the fourth state, the third state, and the first state, the controller is configured to implement:
   the first-third interim state subsequent to implementing a first instance of the first state;
   the controller is configured to implement the third-fourth interim state subsequent to implementing a first instance of the third state;
   the controller is configured to implement the fourth-third interim state subsequent to implementing the fourth state; and
   the controller is configured to implement the third-first interim state subsequent to implementing a second instance of the third state.

7. The IC of claim 1, wherein:
   during a first switching cycle, the controller is configured to implement a state sequence in the following order: the first state, the second state, the fourth state, the second state, the first state, the third state, the fourth state, the third state, and the first state.

8. The IC of claim 1, wherein:
   during a first switching cycle, the controller is configured to implement a state sequence in the following order: the first state, the second state, the fourth state, the second state, the first state, the second state, the fourth state, the second state, the first state, the first state, the third state, the fourth state, the third state, the first state, the third state, the fourth state, the third state, and the first state.

9. An electronic device, comprising:
   a first half bridge including a first transistor coupled to a second transistor, each of the first and second transistors having a respective control input;
   a second half bridge coupled to the first half bridge, the second half bridge including a third transistor coupled to a fourth transistor, each of the third and fourth transistors having a respective control input; and
   a controller having first, second, third, and fourth control outputs coupled to respective control inputs of the first, second, third, and fourth transistors, the control configured to provide control signals on the first, second, third, and fourth control outputs such that the controller implements a state sequence for the transistors of the first and second half bridges, the state sequence including a first state in which the first and fourth transistors are ON and the second and third transistors are OFF, a second state in which the first and third transistors are ON and the second and fourth transistors are OFF, a third state in which the second and fourth transistors are ON and the first and third transistors are OFF, and a fourth state in which the second and third transistors are ON and the first and fourth transistors are OFF, and, during each switching cycle, the controller is configured to implement the first and fourth states with one of the second or third states implemented between instances of the first and fourth states, with every n switching cycles alternating which of the second or third states is implemented between instances of the first and fourth states, where n is an integer.

10. The electronic device of claim 9, where n is 1.

11. The electronic device of claim 9, where n is 2.

12. The electronic device of claim 9, wherein:
the state sequence includes
   a first-second interim state in which the first transistor is ON and the second, the third, and the fourth transistors are OFF;
   a first-third interim state in which the fourth transistor is ON, the first, the second, and the third transistors are OFF, and a body diode of the second transistor is ON;
   a second-fourth interim state in which the third transistor is ON, the first, the second, and the fourth transistors are OFF, and the body diode of the second transistor is ON;
   a third-fourth interim state in which the second transistor is ON, the first, the third, and the fourth transistor are OFF, and a body diode of the third transistor is ON;
   a fourth-second interim state in which the third transistor is ON, the first, the second, and the fourth transistors are OFF, and a body diode of the first transistor is ON;
   a fourth-third interim state in which the second transistor is ON, the first, the third, and the fourth transistors are OFF, and a body diode of the fourth transistor is ON;
   a second-first interim state in which the first transistor is ON, the second, the third, and the fourth transistors are OFF, and the body diode of the fourth transistor is ON; and
   a third-first interim state in which the fourth transistor is ON, the first, the second, and the third transistors are ON, and the body diode of the first transistor is ON.

13. The electronic device of claim 12, wherein in response to the controller implementing a state sequence in the following order: the first state, the second state, the fourth state, the second state, and the first state, the controller is configured to implement:
   the first-second interim state subsequent to implementing a first instance of the first state;
   the controller is configured to implement the second-fourth interim state subsequent to implementing a first instance of the second state;
   the controller is configured to implement the fourth-second interim state subsequent to implementing the fourth state; and
   the controller is configured to implement the second-first interim state subsequent to implementing a second instance of the second state.

14. The electronic device of claim 12, wherein in response to the controller implementing a state sequence in the following order: the first state, the third state, the fourth state, the third state, and the first state, the controller is configured to implement:
   the first-third interim state subsequent to implementing a first instance of the first state;
   the controller is configured to implement the third-fourth interim state subsequent to implementing a first instance of the third state;
   the controller is configured to implement the fourth-third interim state subsequent to implementing the fourth state; and
   the controller is configured to implement the third-first interim state subsequent to implementing a second instance of the third state.

15. The electronic device of claim 9, wherein:
during a first switching cycle, the controller is configured to implement a state sequence in the following order: the first state, the second state, the fourth state, the second state, the first state, the third state, the fourth state, the third state, and the first state.

16. The electronic device of claim 9, wherein:
during a first switching cycle, the controller is configured to implement a state sequence in the following order: the first state, the second state, the fourth state, the second state, the first state, the second state, the fourth state, the second state, the first state, the first state, the third state, the fourth state, the third state, the first state, the third state, the fourth state, the third state, and the first state.

17. A system, comprising:
a first half bridge including a first transistor coupled to a second transistor, each of the first and second transistors having a respective control input;
a second half bridge coupled to the first half bridge, the second half bridge including a third transistor coupled to a fourth transistor, each of the third and fourth transistors having a respective control input;
respective driver circuits coupled to each of the respective control inputs;
a transistor coupled to the first half bridge, the second half bridge, and an output capacitor; and
a controller coupled to the output capacitor and including a memory, wherein the controller includes first, second, third, and fourth control outputs coupled to the respective driver circuits;
wherein the control is configured to provide control signals on the first, second, third, and fourth control outputs such that the controller implements a state sequence for the transistors of the first and second half bridges, the state sequence including a first state in which the first and fourth transistors are ON and the second and third transistors are OFF, a second state in which the first and third transistors are ON and the second and fourth transistors are OFF, a third state in which the second and fourth transistors are ON and the first and third transistors are OFF, and a fourth state in which the second and third transistors are ON and the first and fourth transistors are OFF; and
wherein for each switching cycle, the controller is configured to implement the first and fourth states with one of the second or third states implemented between instances of the first and fourth states, with every n switching cycles alternating which of the second or third states is implemented between instances of the first and fourth states, where n is an integer.

18. The system of claim 17, wherein:
during a first switching cycle, the controller is configured to implement a state sequence in the following order: the first state, the second state, the fourth state, the second state, the first state, the third state, the fourth state, the third state, and the first state.

19. The system of claim 17, wherein:
during a first switching cycle, the controller is configured to implement a state sequence in the following order: the first state, the second state, the fourth state, the second state, the first state, the second state, the fourth state, the second state, the first state, the first state, the third state, the fourth state, the third state, the first state, the third state, the fourth state, the third state, and the first state.

20. The system of claim 19, wherein:
the state sequence includes
- a first-second interim state in which the first transistor is ON and the second, the third, and the fourth transistors are OFF;
- a first-third interim state in which the fourth transistor is ON, the first, the second, and the third transistors are OFF, and a body diode of the second transistor is ON;
- a second-fourth interim state in which the third transistor is ON, the first, the second, and the fourth transistors are OFF, and the body diode of the second transistor is ON;
- a third-fourth interim state in which the second transistor is ON, the first, the third, and the fourth transistor are OFF, and a body diode of the third transistor is ON;
- a fourth-second interim state in which the third transistor is ON, the first, the second, and the fourth transistors are OFF, and a body diode of the first transistor is ON;
- a fourth-third interim state in which the second transistor is ON, the first, the third, and the fourth transistors are OFF, and a body diode of the fourth transistor is ON;
- a second-first interim state in which the first transistor is ON, the second, the third, and the fourth transistors are OFF, and the body diode of the fourth transistor is ON; and
- a third-first interim state in which the fourth transistor is ON, the first, the second, and the third transistors are ON, and the body diode of the first transistor is ON.

* * * * *